United States Patent
Stacey et al.

(10) Patent No.: US 9,912,489 B2
(45) Date of Patent: Mar. 6, 2018

(54) MULTIPLE-USER REQUEST-TO-SEND FRAMES IN A HIGH-EFFICIENCY WIRELESS LOCAL-AREA NETWORK (HEW)

(71) Applicant: Intel IP Corporation, Santa Clara, CA (US)

(72) Inventors: Robert J. Stacey, Portland, OR (US); Po-Kai Huang, West Lafayette, IN (US)

(73) Assignee: Intel IP Corporation, Santa Clara, CA (US)

( * ) Notice: Subject to any disclaimer, the term of this patent is extended or adjusted under 35 U.S.C. 154(b) by 81 days.

(21) Appl. No.: 14/927,854

(22) Filed: Oct. 30, 2015

(65) Prior Publication Data
US 2017/0012791 A1 Jan. 12, 2017

Related U.S. Application Data (60) Provisional application No. 62/190,848, filed on Jul. 10, 2015.

(51) Int. Cl.
*H04L 12/18* (2006.01)
*H04W 84/12* (2009.01)
*H04L 5/00* (2006.01)

(52) U.S. Cl.
CPC .......... *H04L 12/189* (2013.01); *H04L 5/0053* (2013.01); *H04W 84/12* (2013.01); *H04L 5/0007* (2013.01)

(58) Field of Classification Search
CPC ... H04L 12/189; H04L 5/0007; H04L 5/0053; H04W 84/12; H04W 12/189
See application file for complete search history.

(56) References Cited

U.S. PATENT DOCUMENTS

| | | | | |
|---|---|---|---|---|
| 2011/0317625 A1* | 12/2011 | Urquhart | ............... | H04W 16/10 370/328 |
| 2014/0307650 A1* | 10/2014 | Vermani | ............... | H04L 5/0044 370/329 |
| 2015/0124687 A1* | 5/2015 | Wentink | .................. | H04W 4/06 370/312 |
| 2015/0382216 A1* | 12/2015 | Tian | ...................... | H04W 24/08 370/252 |

\* cited by examiner

*Primary Examiner* — Gbemileke J Onamuti
(74) *Attorney, Agent, or Firm* — Schwegman Lundberg & Woessner, P.A.

(57) ABSTRACT

Apparatuses, computer readable media, and methods for sending and receiving multi-user request-to-send frames in a high-efficiency wireless local-area network (HEW) are disclosed. HEW frames are sent with frame types and subtypes the same as legacy frames with a length field greater than a legacy length to indicate the frame is a HEW frame. An apparatus of a high-efficiency (HE) wireless local-area network device is disclosed. The apparatus including transceiver circuitry and processing circuitry configured to receive a frame comprising a legacy frame type, a legacy frame sub-type, and a length in a legacy signal field (L-SIG), and determine the frame is an HE frame if the length is greater than a threshold length, wherein the threshold length is greater than a second length of a legacy frame of the legacy frame type and legacy frame sub-type.

25 Claims, 6 Drawing Sheets

MULTIPLE-USER REQUEST-TO-SEND FRAMES IN A HIGH-EFFICIENCY WIRELESS LOCAL-AREA NETWORK (HEW)

PRIORITY CLAIM

This application claims the benefit of priority under 35 USC 119(e) to U.S. Provisional Patent Application Ser. No. 62/190,848, filed Jul. 10, 2015, which is incorporated herein by reference in their entirety.

TECHNICAL FIELD

Embodiments relate to wireless devices. Some embodiments relate to Institute of Electrical and Electronic Engineers (IEEE) 802.11. Some embodiments relate to IEEE 802.11ax. Some embodiments relate to sending and receiving IEEE 802.11ax frames. Some embodiments relate to a multi-user request to send (MU-RTS) frames. Some embodiments relate to setting a network allocation vector (NAV) field.

BACKGROUND

Efficient use of the resources of a wireless local-area network (WLAN) is important to provide bandwidth and acceptable response times to the users of the WLAN. Moreover, wireless devices may need to operate with both newer protocols and with legacy device protocols, and may need to operate in range of more than one access point and in the range of other wireless devices.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
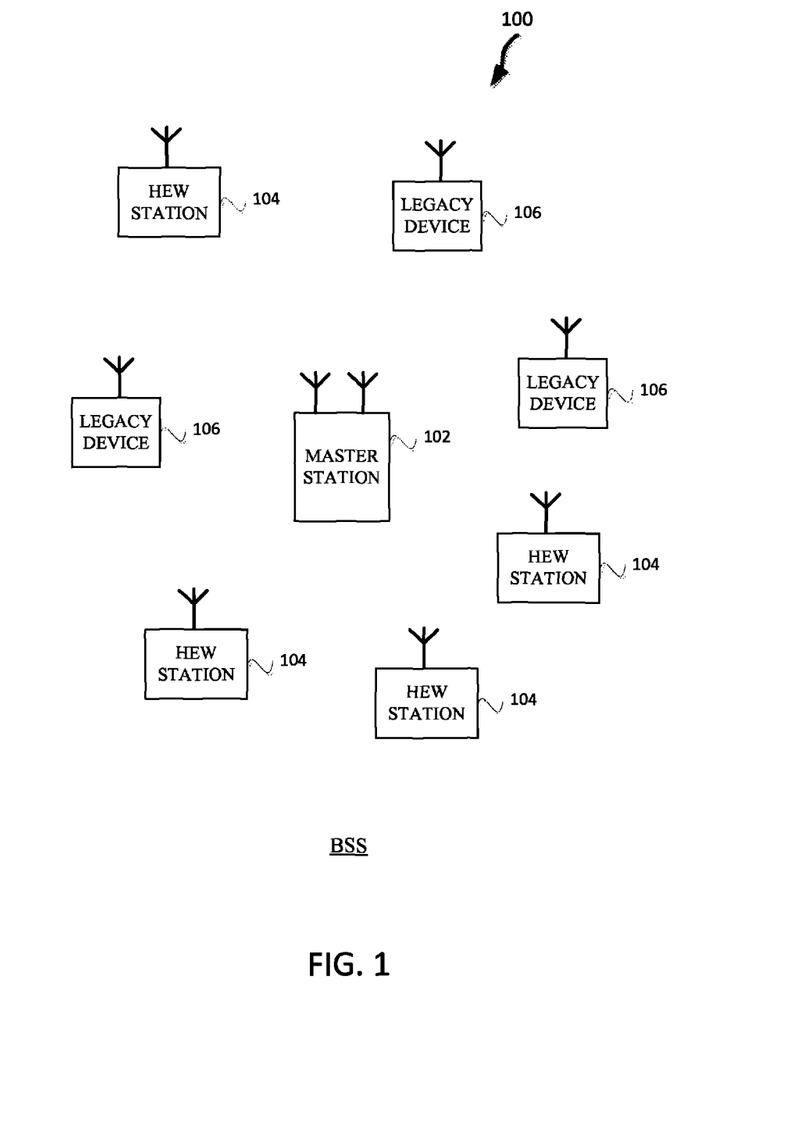
FIG. 1 illustrates a WLAN in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The legacy devices 106 may operate in accordance with one or more of IEEE 802.11a/b/g/n/ac/ad/af/ah/aj, or another legacy wireless communication standard. The legacy devices 106 may be STAs or IEEE 802.11 STAs. The HEW STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques.

In some embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HEW frame may be configured for transmitting a number of spatial streams, which may be in accordance with MU-MIMO. In other embodiments, the master station 102, HEW STA 104, and/or legacy device 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating.

In accordance with some embodiments, during the master-sync transmission the HEW STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW device 104 and/or the master station 102 are configured to perform the methods and functions herein described in conjunction with FIGS. 1-8.

Figure 2:
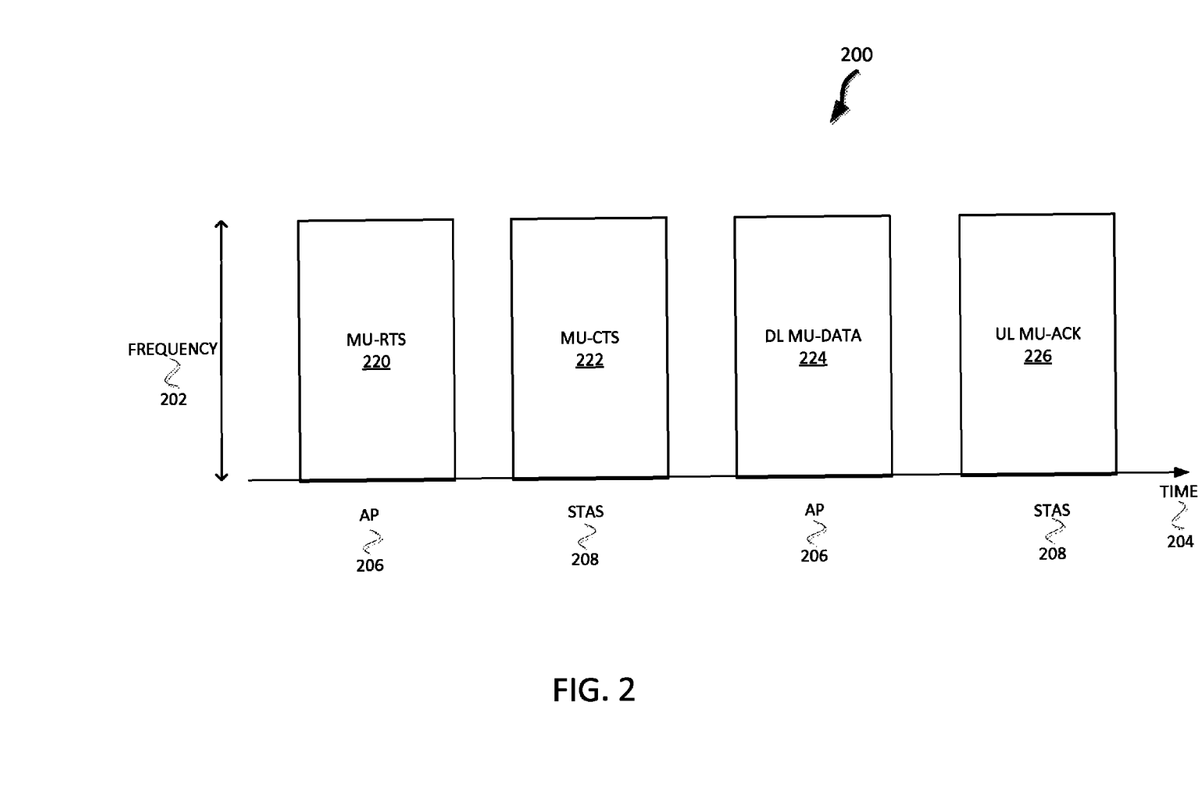
FIG. 2 illustrates a method for sending an MU-RTS in accordance with some embodiments.

FIG. 2 illustrates a method 200 for sending an MU-RTS 220 in accordance with some embodiments. Illustrated in FIG. 2 is time 204 along a horizontal axis and frequency 202 along a vertical axis. The frequency 202 may be channel such as described herein (e.g., 80 MHz).

The method 200 begins with a MU-RTS 220 packet being transmitted by an AP 206, which may be a master station 102. The MU-RTS 220 may be a packet such as described in conjunction with FIG. 3-5. For example, the MU-RTS 220 may be have a frame format of a single-user request-to-send (SU-RTS) and keep the frame control field of the SU-RTS and utilize the length field in the legacy signal (L-SIG) field as an indicator that the frame is not the legacy frame, but a MU-RTS 220.

The MU-RTS 220 is received by STAs 208, which transmit MU-CTS 222 in response. The STAs 208 are configured to determine that a length field in the L-SIG indicates the frame is a MU-RTS 220 and not a legacy RTS frame. The STAs 208 may be HEW stations 104. In response to the MU-RTS 220, the STAs 208 transmit multiple simultaneous CTS frames to provide network allocation vector (NAV) protection for the DL MU-DATA 224 and the UL MU-ACK 226. The MU-RTS 220 may include an indication of which STAs 208 should transmit MU-CTS 222. Some embodiments of the MU-RTS 220 method 200 and frame format (FIG. 3-5) do not preserve NAV cancelation or preserve NAV cancelation but require additional frame to facilitate the protection process.

The method 200 continues with the AP 206 transmitting the downlink multi-user data (DL MU-DATA) 224. Other STAs 208 in the neighborhood should have received a MU-CTS 222 and set a NAV not to compete for the wireless medium during the DL MU-DATA 224.

The method 200 continues with the STAs 208 transmitting uplink (UL) multi-user acknowledgements (UL MU-ACKs) 226. The UL MU-ACKs 226 are in response to the DL MU-DATA 224. Other STAs 208 in the neighborhood should have received a MU-CTS 222 and set a NAV not to compete for the wireless medium during the UL MU-ACK 226. The method 200 may end.

Figure 3:
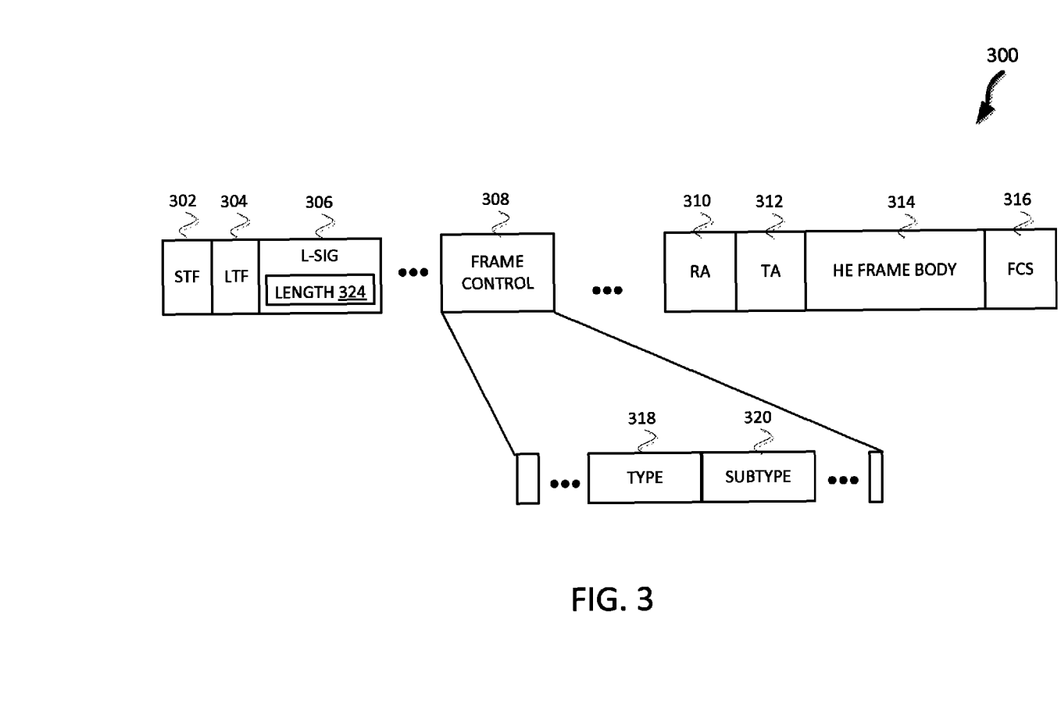
FIG. 3 illustrates a HEW frame in accordance with some embodiments.

FIG. 3 illustrates a HEW frame 300 in accordance with some embodiments. Illustrated in FIG. 3 is a short training field (STF) 302, long training field (LTF) 304, legacy signal (L-SIG) 306 field, a frame control 308, receiver address (RA) 310, transmitter address (TA) 312, HE frame body 314, and frame check sequence (FCS) 316. The STF 302 and LTF 304 are training fields that may be used for such things as synchronizing and timing. The L-SIG 406 includes fields for length 324 and data rate. The length 324 may indicate the length of the HEW frame 300.

The frame control 308 includes a type 318 and subtype 320. The type 318 and subtype 320 are used to indicate a type of frame which may be a legacy frame. For example, the type 318 and subtype 320 may indicate the frame is a RTS frame. The RA 310 may be a receiver address. In some embodiments there is not a RA 310. The transmitter address 312 is an address of the transmitter of the HEW frame 300. The HE frame body 314 may be a body of the frame. The FCS 316 may include information to check the integrity of the frame such as a cyclic redundancy check.

The L-SIG 306 includes a length 324 of the transmitted packet. The master station 102 and HEW station 104 may be configured to set the length 324 to a value that is longer than the length of a legacy frame of the type 318 and subtype 320. The master station 102 and HEW station 104 may then determine that a received frame is a HEW frame 300 based on the length 324 being longer than a legacy frame of the type 318 and subtype 320. The length 324 may indicate that the frame is a HEW frame 300 if the length 324 is greater than a threshold which is a predetermined value based on the type 318 and subtype 320.

There may be more than one preamble before the frame control 308 that may be used by different wireless communication protocols to indicate the type of protocol. Legacy stations 106 will read the length 324 and defer for the period of time of the length 324 and will not be able to decode at least a portion of the HEW frame 300. The legacy stations 106 will then reset their NAV.

Figure 4:
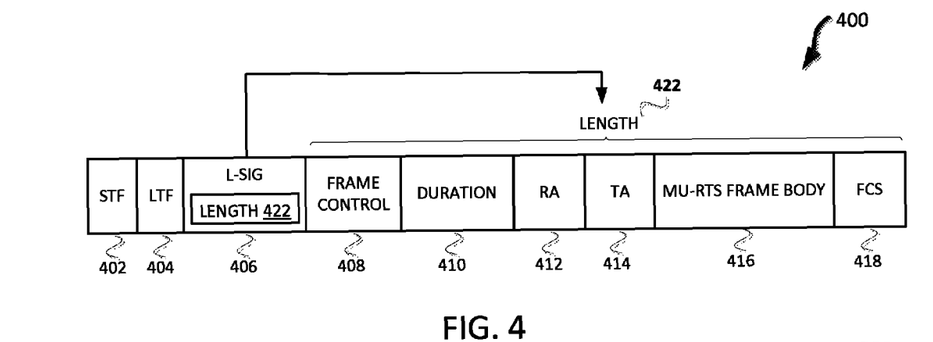
FIG. 4 illustrates a MU-RTS frame in accordance with some embodiments.

FIG. 4 illustrates a MU-RTS frame 400 in accordance with some embodiments. The MU-RTS frame 400 is a HEW MU-RTS frame. The MU-RTS frame 400 includes a STF

402, LTF 404, L-SIG 406, frame control 408, duration 410, RA 412, TA 414, MU-RTS frame body 416, and FCS 418. The STF 402, LTF 404, and L-SIG 406 may be in accordance with IEEE 802.11a or IEEE 802.11-2012. The length 422 is the length 422 of the MU-RTS frame 400. The frame control 408 is the same or similar to the frame control 308 (FIG. 3). The frame control 408 for the MU-RTS frame 400 is set to a type and subtype for a legacy RTS frame.

The duration 410 is a duration for the receivers of the MU-RTS frame 400 to use to set in clear-to-sends (CTSs) for how long to set their NAVs. For example, the MU-CTS 220 may have included a duration 410 that indicated the MU-CTS 222 should include a duration for STAs 208 to defer to the end of the UL MU-ACK 226. As another example the duration 410 may be a duration of a transmission opportunity that the sender of the MU-RTS frame 400 is about to begin. The RA 412 may be set as multicast address for the stations polled in MU-RTS frame 400, set as the value of TA, set as one of the MAC address of the stations polled in MU-RTS frame 400, set as basic service set identification (BSSID), or set as the multicast address for the IEEE 802.1 lax stations in the BSS of a master station 102 that transmitted the MU-RTS frame 400. In some embodiments there may not be an RA 412.

The TA 414 may be the transmitter address such as a master station 102. The MU-RTS frame body 416 may be the body of the frame. For example, the MU-RTS frame body 416 may include an indication of which HEW stations 104 should transmit a CTS. The MU-RTS frame body 416 may include other information for the HEW stations 104 to determine whether to transmit a CTS, on which sub-channel to transmit the CTS, how long to indicate for other wireless devices to set their NAV, and for how long for the HEW station 104 to set a NAV. The FCS 418 may be the same or similar to the FCS 316.

The HEW stations 104 and master stations 102 may determine the MU-RTS frame 400 is a MU-RTS 400 frame based on the length 422 being longer than a legacy RTS frame. MU-RTS 400 may be an embodiment for IEEE 802.11a.

The length 422 may be set to a value that is not the actual length 522 as the indication that the frame is a HEW frame and not a legacy frame. The HEW station 104 and/or master station 102 may then adjust the received length 422 to the actual length of the MU-RTS frame 422.

Figure 5:
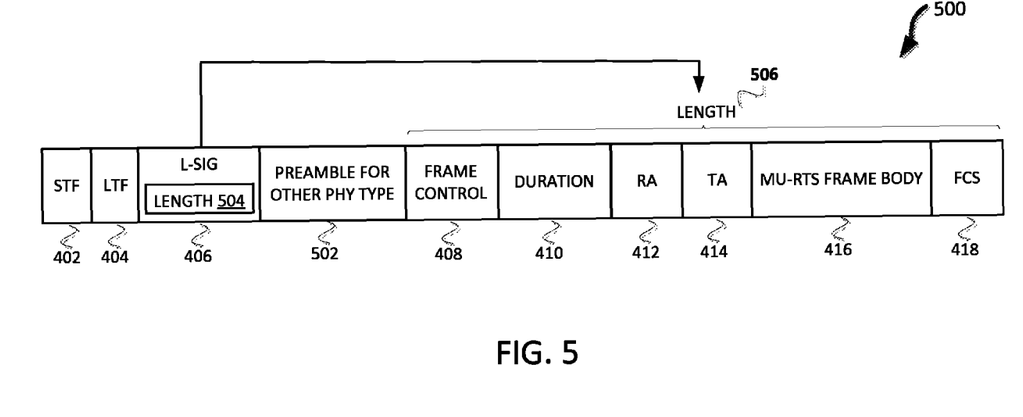
FIG. 5 illustrates a MU-RTS frame in accordance with some embodiments.

FIG. 5 illustrates a MU-RTS frame 500 in accordance with some embodiments. FIG. 5 illustrates STF 402, LTF 404, L-SIG 406, preamble for other physical (PHY) type 502, frame control 408, duration 410, RA 412, TA 414, MU-RTS frame body 416, and FCS 418. The STF 402, LTF 404, and L-SIG 406 may be the same or similar to STF 302, LTF 304, and L-SIG 306, respectively. The length 504 may be the length of the MU-RTS frame 500. In some embodiments, the length 504 may be based on the length of the MU-RTS frame 500. The length 504 may be set to a value that is not the actual length 506 as the indication that the frame is a HEW frame and not a legacy frame. The HEW station 104 and/or master station 102 may then adjust the received length 504 to the actual length of the MU-RTS frame 500.

The preamble for other PHY type 502 may be additional preamble fields that are used for wireless communication protocols other than IEEE 802.11a or IEEE 802.11-2012. For example, IEEE 802.11n or IEEE 802.11ac.

Figure 6:
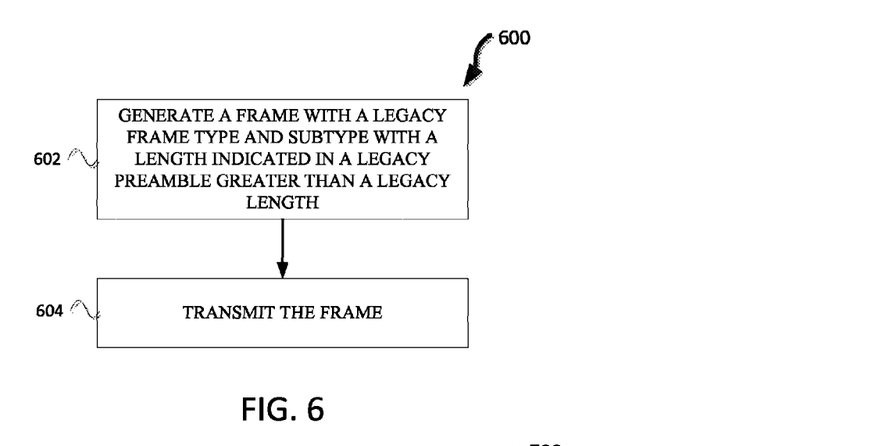
FIG. 6 illustrates a method for transmitting a HEW frame in accordance with some embodiments.

FIG. 6 illustrates a method 600 for transmitting a HEW frame in accordance with some embodiments. The method 600 begins at operation 602 with generating a frame with a legacy frame type and subtype with a length indicated in a legacy preamble greater than a legacy length. For example, in FIGS. 3, 4, and 5, a frame is illustrated with the type 318 and subtype 320 set to a legacy type (e.g., RTS), and the length 324, 422, and 504, respectively, set to value that is larger than a legacy value of the length would be.

The method 600 continues with operation 604 with transmitting the frame. The frame may be transmitted in accordance with OFDMA and/or MU-MIMO. The method 600 may end.

Figure 7:
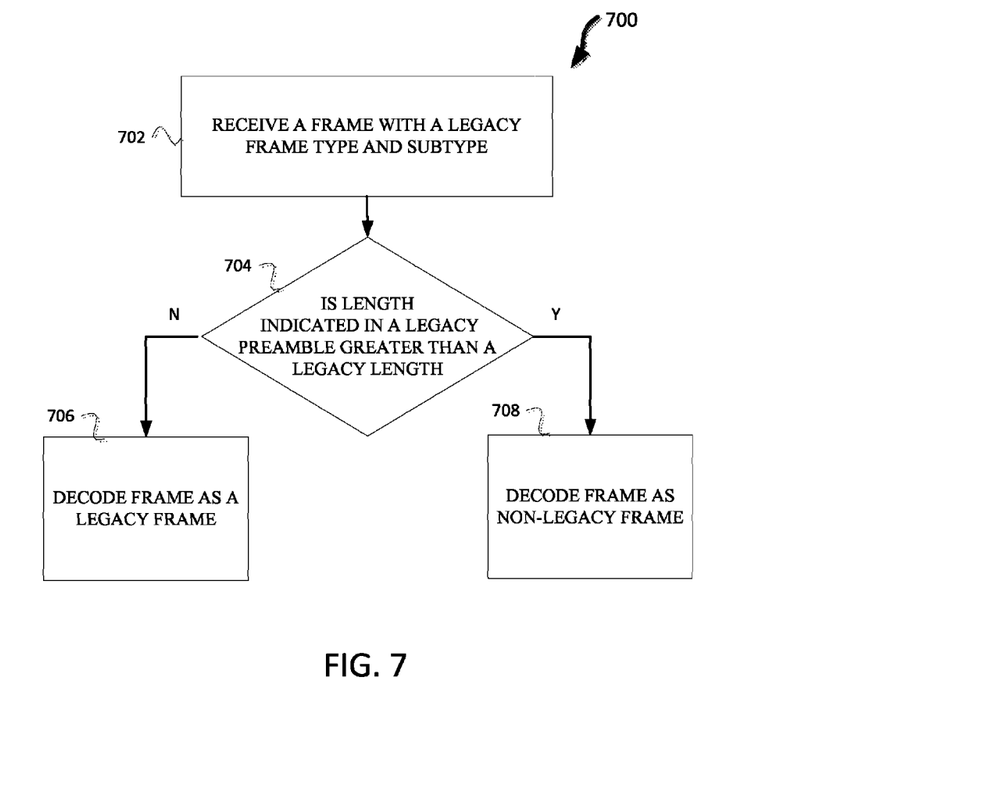
FIG. 7 illustrates a method for receiving a frame in accordance with some embodiments.

FIG. 7 illustrates a method 700 for receiving a frame in accordance with some embodiments. The method 700 begins at operation 702 with receiving a frame with a legacy frame type and subtype. For example, frame 300, 400, and 500 of FIGS. 3-5. The method 700 continues at operation 704 with is the length indicated in a legacy preamble greater than a legacy length. For example, the length 324, 422, and 504 of FIGS. 3, 4, and 5, respectively, is longer than a length of a legacy frame.

If the length indicated in the legacy preamble is greater than a legacy length, then the method 700 continues at operation 708 with decoding the frame as a non-legacy frame. For example, the frames 300, 400, and 500 are decoded as HEW frames. If the length indicated in the legacy preamble is not greater than a legacy length, then the method 700 continues at operation 706 with decoding the frame as a legacy frame. For example, the frame may be a legacy frame (not illustrated) as described in a legacy wireless communication standard such as IEEE 802.11a. The method 700 may end.

Figure 8:
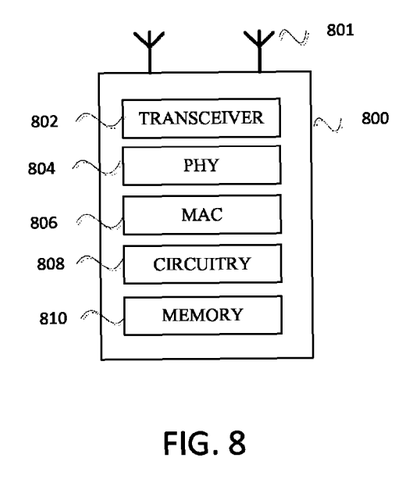
FIG. 8 illustrates a HEW device in accordance with some embodiments.

FIG. 8 illustrates a HEW device 800 in accordance with some embodiments. HEW device 800 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 800 may be suitable for operating as master station 102 (FIG. 1) or a HEW STA 104 (FIG. 1). In accordance with embodiments, HEW device 800 may include, among other things, a transmit/receive element 801 (for example an antenna), a transceiver 802, physical (PHY) circuitry 804, and media access control (MAC) circuitry 806. PHY circuitry 804 and MAC circuitry 806 may be HEW compliant layers and may also be compliant with one or more legacy IEEE 802.13 standards. MAC circuitry 806 may be arranged to configure packets such as a physical layer convergence procedure (PLCP) protocol data unit (PPDUs) and arranged to transmit and receive PPDUs, among other things. HEW device 800 may also include circuitry 808 and memory 810 configured to perform the various operations described herein. The circuitry 808 may be coupled to the transceiver 802, which may be coupled to the transmit/receive element 801. While FIG. 8 depicts the circuitry 808 and the transceiver 802 as separate components, the circuitry 808 and the transceiver 802 may be integrated together in an electronic package or chip.

In some embodiments, the MAC circuitry 806 may be arranged to contend for a wireless medium during a contention period to receive control of the medium for the HEW control period and configure an HEW PPDU. In some embodiments, the MAC circuitry 806 may be arranged to contend for the wireless medium based on channel contention settings, a transmitting power level, and a CCA level.

The PHY circuitry 804 may be arranged to transmit the HEW PPDU. The PHY circuitry 804 may include circuitry for modulation/demodulation, upconversion/downconversion, filtering, amplification, etc. In some embodiments, the circuitry 808 may include one or more processors. The circuitry 808 may be configured to perform functions based on instructions being stored in a RAM or ROM, or based on special purpose circuitry. The circuitry 808 may include processing circuitry and/or transceiver circuitry in accordance with some embodiments. The circuitry 808 may include a processor such as a general purpose processor or special purpose processor. The circuitry 808 may implement one or more functions associated with transmit/receive elements 801, the transceiver 802, the PHY circuitry 804, the MAC circuitry 806, and/or the memory 810.

In some embodiments, the circuitry 808 may be configured to perform one or more of the functions and/or methods described herein and/or in conjunction with FIGS. 1-8.

In some embodiments, the transmit/receive elements 801 may be two or more antennas that may be coupled to the PHY circuitry 804 and arranged for sending and receiving signals including transmission of the HEW packets. The transceiver 802 may transmit and receive data such as HEW PPDU and packets that include an indication that the HEW device 800 should adapt the channel contention settings according to settings included in the packet. The memory 810 may store information for configuring the other circuitry to perform operations for configuring and transmitting HEW packets and performing the various operations to perform one or more of the functions and/or methods described herein and/or in conjunction with FIGS. 1-8.

In some embodiments, the HEW device 800 may be configured to communicate using OFDM communication signals over a multicarrier communication channel. In some embodiments, HEW device 800 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 800 may use 4× symbol duration of 802.11n or 802.11ac.

In some embodiments, an HEW device 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical or wearable device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 801 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 800 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 800 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The following examples pertain to further embodiments. Example 1 is an apparatus of a wireless device. The apparatus comprising memory and processing circuitry configured to: decode a frame comprising a legacy frame type, a legacy frame sub-type, and a length in a legacy signal field (L-SIG), and determine the frame is an high-efficiency (HE) frame if the length is greater than a threshold length, wherein the threshold length is a legacy length of a legacy frame of the legacy frame type and the legacy frame sub-type.

In Example 2, the subject matter of Example 1 can optionally include where the legacy frame type and legacy frame sub-type indicate a legacy request-to-send (RTS) frame.

In Example 3, the subject matter of Example 2 can optionally include where the processing circuitry is further configured to determine the frame is the HE frame if the length is greater than a second length of a legacy RTS frame, wherein the HE frame is a multi-user RTS (MU-RTS) frame.

In Example 4, the subject matter of Example 3 can optionally include where the length is 20 bytes or greater to indicate the frame is the MU-RTS frame.

In Example 5, the subject matter of Example 3 can optionally include where the processing circuitry is further configured to: if the frame is the MU-RTS frame, determine whether the MU-RTS frame indicates the wireless device should respond to the MU-RTS.

In Example 6, the subject matter of Example 5 can optionally include where the MU-RTS frame further comprises a MU-RTS frame body that indicates one or more wireless device that are to respond with a multi-user clear-to-send (MU-CTS).

In Example 7, the subject matter of Example 5 can optionally include where the MU-RTS frame indicates the wireless device with one from the following group: a multi-cast address, a transmitter address of a transmitter of the frame, a media access control (MAC) address of an HE device of the one or more HE devices that are to respond with the MU-CTS, a basic service set identification (BSSID), and a multicast address for Institute of Electrical and Electronic Engineers (IEEE) 802.11ax stations in a same basic service set (BSS) as a transmitter of the frame.

In Example 8, the subject matter of Example 5 can optionally include where the MU-RTS frame is devoid of a receiver address field.

In Example 9, the subject matter of Example 3 can optionally include where the processing circuitry is further configured to: if the frame is the MU-RTS frame, transmit a multi-user clear-to-send (MU-CTS) concurrently with other wireless devices indicated in the MU-RTS in accordance with the MU-RTS and in accordance with orthogonal frequency division multiple access (OFDMA).

In Example 10, the subject matter of any of Examples 1-9 can optionally include where the wireless apparatus is at least one from the following group: a high-efficiency wireless local-area network (HEW) station, a master station, a HEW master station, an Institute of Electrical and Electronic Engineers (IEEE) 802.11ax access point, and an IEEE 802.11ax station.

In Example 11, the subject matter of any of Examples 1-10 can optionally include one or more antennas coupled to the processing circuitry.

In Example 12, the subject matter of Example 11 can optionally include where the processing circuitry is further configured to: receive the frame.

Example 13 is a non-transitory computer-readable storage medium that stores instructions for execution by one or more processors. The instructions to configure the one or more processors to cause a wireless device to: decode a frame comprising a legacy frame type, a legacy frame sub-type, and a first length in a legacy signal field (L-SIG), and determine the frame is a high-efficiency (HE) wireless local-area network (HEW) frame and not a legacy frame if the first length is greater than a threshold length, wherein the threshold length is greater than or equal to a second length of the legacy frame.

In Example 14, the subject matter of Example 13 can optionally include where the legacy frame type and the legacy frame sub-type indicate a legacy request-to-send (RTS) frame.

In Example 15, the subject matter of Example 14 can optionally include where the instructions further configure the one or more processors to cause the wireless device to: determine the frame is the HE frame if the first length is greater than the second length of a legacy RTS frame, wherein the HE frame is a multi-user RTS (MU-RTS) frame.

In Example 16, the subject matter of Example 15 can optionally include where the first length is 20 bytes or greater to indicate the frame is the MU-RTS frame.

In Example 17, the subject matter of Example 15 can optionally include where the instructions further configure the one or more processors to cause the wireless device to: if the frame is the MU-RTS frame, determine whether a receiver address (RA) field of the MU-RTS frame indicates the wireless device should respond to the MU-RTS.

Example 18 is an apparatus of a wireless device. The apparatus comprising memory and processing circuitry configured to: generate a high-efficiency (HE) frame comprising a legacy frame type, a legacy frame sub-type, and a length in a legacy signal field (L-SIG), wherein the length is greater than a threshold to indicate the HE frame is the HE frame and not a legacy frame.

In Example 19, the subject matter of Example 18 can optionally include where the legacy frame type and legacy frame sub-type indicate a legacy request-to-send (RTS) frame.

In Example 20, the subject matter of Example 19 can optionally include where the length is 20 bytes or greater to indicate the frame is a MU-RTS frame.

In Example 21, the subject matter of Example 19 can optionally include where the HE frame is a MU-RTS frame that further comprises a MU-RTS frame body that indicates one or more HE devices that are to respond with a multi-user clear-to-send (MU-CTS).

In Example 22, the subject matter of any of Examples 18-21 can optionally include one or more antennas coupled to the processing circuitry.

Example 23 is a method performed by a wireless device. The method comprising: receiving a frame comprising a legacy frame type, a legacy frame sub-type, and a length in a legacy signal field (L-SIG); and determining the frame is an high-efficiency (HE) frame if the length is greater than a threshold length, wherein the threshold length is a legacy length of a legacy frame of the legacy frame type and the legacy frame sub-type.

In Example 24, the subject matter of Example 23 can optionally include where the legacy frame type and the legacy frame sub-type indicate a legacy request-to-send (RTS) frame.

In Example 25, the subject matter of Examples 23 or 24 can optionally include determining the frame is the HE frame if the length is greater than the second length of a legacy RTS frame, wherein the HE frame is a multi-user RTS (MU-RTS) frame.

Example 26 is a non-transitory computer-readable storage medium that stores instructions for execution by one or more processors. The instructions to configure the one or more processors to cause a wireless device to: generate a high-efficiency (HE) frame comprising a legacy frame type, a legacy frame sub-type, and a length in a legacy signal field (L-SIG), wherein the length is greater than a threshold to indicate the HE frame is the HE frame and not a legacy frame.

In Example 27, the subject matter of Example 26 can optionally include where the legacy frame type and legacy frame sub-type indicate a legacy request-to-send (RTS) frame.

In Example 28, the subject matter of Example 27 can optionally include where the length is 20 bytes or greater to indicate the frame is a MU-RTS frame.

In Example 29, the subject matter of any of Examples 26-29 can optionally include where the HE frame is a MU-RTS frame that further comprises a MU-RTS frame body that indicates one or more HE devices that are to respond with a multi-user clear-to-send (MU-CTS).

Example 30 is a method performed by a wireless device. The method comprising: generating a high-efficiency (HE) frame comprising a legacy frame type, a legacy frame sub-type, and a length in a legacy signal field (L-SIG), wherein the length is greater than a threshold to indicate the HE frame is the HE frame and not a legacy frame.

In Example 31, the subject matter of Example 30 can optionally include where the legacy frame type and legacy frame sub-type indicate a legacy request-to-send (RTS) frame.

In Example 32, the subject matter of Example 31 can optionally include where the length is 20 bytes or greater to indicate the frame is a MU-RTS frame.

In Example 33, the subject matter of any of Examples 30-32 can optionally include where the HE frame is a MU-RTS frame that further comprises a MU-RTS frame body that indicates one or more HE devices that are to respond with a multi-user clear-to-send (MU-CTS).

Example 34 is an apparatus of a wireless device. The apparatus comprising means for decoding a frame comprising a legacy frame type, a legacy frame sub-type, and a length in a legacy signal field (L-SIG); and means for determining the frame is an high-efficiency (HE) frame if the length is greater than a threshold length, wherein the threshold length is a legacy length of a legacy frame of the legacy frame type and the legacy frame sub-type.

In Example 35, the subject matter of Example 34 can optionally include where the legacy frame type and legacy frame sub-type indicate a legacy request-to-send (RTS) frame.

In Example 36, the subject matter of Example 34 can optionally include where means for determining the frame is the HE frame if the length is greater than a second length of a legacy RTS frame, wherein the HE frame is a multi-user RTS (MU-RTS) frame.

In Example 37, the subject matter of Example 36 can optionally include where the length is 20 bytes or greater to indicate the frame is the MU-RTS frame.

In Example 38, the subject matter of Example 36 can optionally include if the frame is the MU-RTS frame, means for determining whether the MU-RTS frame indicates the wireless device should respond to the MU-RTS.

In Example 39, the subject matter of Example 38 can optionally include where the MU-RTS frame further comprises a MU-RTS frame body that indicates one or more wireless device that are to respond with a multi-user clear-to-send (MU-CTS).

In Example 40, the subject matter of Example 38 can optionally include where the MU-RTS frame indicates the wireless device with one from the following group: a multi-cast address, a transmitter address of a transmitter of the frame, a media access control (MAC) address of an HE device of the one or more HE devices that are to respond with the MU-CTS, a basic service set identification (BSSID), and a multicast address for Institute of Electrical and Electronic Engineers (IEEE) 802.11ax stations in a same basic service set (BSS) as a transmitter of the frame.

In Example 41, the subject matter of Example 38 can optionally include where the MU-RTS frame is devoid of a receiver address field.

In Example 42, the subject matter of Example 36 can optionally include if the frame is the MU-RTS frame, means for transmitting a multi-user clear-to-send (MU-CTS) concurrently with other wireless devices indicated in the MU-RTS in accordance with the MU-RTS and in accordance with orthogonal frequency division multiple access (OFDMA).

In Example 43, the subject matter of any of Examples 34-42 can optionally include where the wireless apparatus is at least one from the following group: a high-efficiency wireless local-area network (HEW) station, a master station, a HEW master station, an Institute of Electrical and Electronic Engineers (IEEE) 802.11ax access point, and an IEEE 802.11ax station.

In Example 44, the subject matter of any of Examples 34-42 can optionally include means for transmitting and receiving radio signals.

Example 45 is an apparatus of a wireless device. The apparatus comprising: means for generating a high-efficiency (HE) frame comprising a legacy frame type, a legacy frame sub-type, and a length in a legacy signal field (L-SIG), wherein the length is greater than a threshold to indicate the HE frame is the HE frame and not a legacy frame.

In Example 46, the subject matter of Example 45 can optionally include where the legacy frame type and legacy frame sub-type indicate a legacy request-to-send (RTS) frame.

In Example 47, the subject matter of Example 46 can optionally include where the length is 20 bytes or greater to indicate the frame is a MU-RTS frame.

In Example 48, the subject matter of Example 46 can optionally include where the HE frame is a MU-RTS frame that further comprises a MU-RTS frame body that indicates one or more HE devices that are to respond with a multi-user clear-to-send (MU-CTS).

In Example 49, the subject matter of any of Examples 45-48 can optionally include means for receiving and transmitting radio signals.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless device, the apparatus comprising: memory and processing circuitry coupled to the memory, the processing circuitry configured to:
    decode a first portion of a frame comprising a legacy frame type, a legacy frame sub-type, and a length in a legacy signal field (L-SIG);
    if the length is greater than a legacy length of a legacy frame of the legacy frame type and the legacy frame sub-type, decode a second portion of the frame in accordance with a high-efficiency (HE) frame format; and
    if the length is not greater than the legacy length, decode the second portion of the frame in accordance with the legacy frame type and the legacy frame sub-type.

2. The apparatus of claim 1, wherein the legacy frame type and legacy frame sub-type indicate a legacy request-to-send (RTS) frame.

3. The apparatus of claim 2, wherein the processing circuitry is further configured to determine the frame is the HE frame if the length is greater than a second length of a legacy RTS frame, wherein the HE frame is a multi-user RTS (MU-RTS) frame.

4. The apparatus of claim 3, wherein the length is 20 bytes or greater to indicate the frame is the MU-RTS frame.

5. The apparatus of claim 3, wherein the processing circuitry is further configured to:
    if the frame is the MU-RTS frame, determine whether the MU-RTS frame indicates the wireless device should respond to the MU-RTS.

6. The apparatus of claim 3, wherein the processing circuitry is further configured to: if the frame is the MU-RTS frame, transmit a multi-user clear-to-send (MU-CTS) concurrently with other wireless devices indicated in the MU-RTS in accordance with the MU-RTS and in accordance with orthogonal frequency division multiple access (OFDMA).

7. The apparatus of claim 5, wherein the MU-RTS frame further comprises a MU-RTS frame body that indicates one or more wireless device that are to respond with a multi-user clear-to-send (MU-CTS).

8. The apparatus of claim 5, wherein the MU-RTS frame indicates the wireless device with one from the following group: a multi-cast address, a transmitter address of a transmitter of the frame, a media access control (MAC) address of an HE device of the one or more HE devices that are to respond with the MU-CTS, a basic service set identification (BSSID), and a multicast address for Institute of Electrical and Electronic Engineers (IEEE) 802.11ax stations in a same basic service set (BSS) as a transmitter of the frame.

9. The apparatus of claim 5, wherein the MU-RTS frame is devoid of a receiver address field.

10. The apparatus of claim 1, wherein the wireless apparatus is at least one from the following group:
a high-efficiency (HE) wireless station, a master station, a HE master station, an Institute of Electrical and Electronic Engineers (IEEE) 802.11ax access point, and an IEEE 802.11ax station.

11. The apparatus of claim 1, further comprising one or more antennas coupled to the processing circuitry.

12. The apparatus of claim 11, wherein the processing circuitry is further configured to: receive the frame.

13. A non-transitory computer-readable storage medium that stores instructions for execution by one or more processors, the instructions to configure the one or more processors to cause a wireless device to:
decode a first portion of a frame comprising a legacy frame type, a legacy frame sub-type, and a first length in a legacy signal field (L-SIG);
if the first length is greater than a threshold length, decode a second portion of the frame in accordance with a high-efficiency (HE) frame format; and
if the first length is not greater than the threshold length, decode the second portion of the frame in accordance with the legacy frame type and the legacy frame sub-type, wherein the threshold length is greater than or equal to a second length of a legacy frame with the legacy frame type and the legacy frame sub-type.

14. The non-transitory computer-readable storage medium of claim 13, wherein the legacy frame type and the legacy frame sub-type indicate a legacy request-to-send (RTS) frame.

15. The non-transitory computer-readable storage medium of claim 14, wherein the instructions further configure the one or more processors to cause the wireless device to:
determine the frame is the HE frame if the first length is greater than the second length of a legacy RTS frame, wherein the HE frame is a multi-user RTS (MU-RTS) frame.

16. The non-transitory computer-readable storage medium of claim 15, wherein the first length is 20 bytes or greater to indicate the frame is the MU-RTS frame.

17. The non-transitory computer-readable storage medium of claim 15, wherein the instructions further configure the one or more processors to cause the wireless device to:
if the frame is the MU-RTS frame, determine whether a receiver address (RA) field of the MU-RTS frame indicates the wireless device should respond to the MU-RTS.

18. An apparatus of a wireless device, the apparatus comprising: memory; and, and processing circuitry coupled to the memory, the processing circuitry configured to:
encode a high-efficiency (HE) frame comprising a first portion in accordance with a legacy format, the first portion comprising a legacy frame type, a legacy frame sub-type, and a length in a legacy signal field (L-SIG), and a second portion encoded in accordance with a HE frame format, wherein the length is greater than a legacy length of a legacy frame of the legacy frame type and the legacy frame sub-type to indicate the second portion is encoded in accordance with the HE frame format and not the legacy frame.

19. The apparatus of claim 18, wherein the legacy frame type and legacy frame sub-type indicate a legacy request-to-send (RTS) frame.

20. The apparatus of claim 19, wherein the length is 20 bytes or greater to indicate the frame is a MU-RTS frame.

21. The apparatus of claim 19, wherein the HE frame is a MU-RTS frame that further comprises a MU-RTS frame body that indicates one or more HE devices that are to respond with a multi-user clear-to-send (MU-CTS).

22. The apparatus of claim 18, further comprising one or more antennas coupled to the processing circuitry.

23. A method performed by a wireless device, the method comprising:
receiving a frame comprising a legacy frame type, a legacy frame sub-type, and a length in a legacy signal field (L-SIG);
if the length is greater than a threshold length, decoding a second portion of the frame in accordance with a high-efficiency (HE) frame format; and
if the length is not greater than the threshold length, decoding the second portion of the frame in accordance with the legacy frame type and the legacy frame sub-type, wherein the threshold length is a legacy length of a legacy frame of the legacy frame type and the legacy frame sub-type.

24. The method of claim 23, wherein the legacy frame type and the legacy frame sub-type indicate a legacy request-to-send (RTS) frame.

25. The method of claim 24, the method further comprising:
determining the frame is the HE frame if the length is greater than the second length of a legacy RTS frame, wherein the HE frame is a multi-user RTS (MU-RTS) frame.

* * * * *